(12) United States Patent
Haberstroh

(10) Patent No.: US 7,065,882 B2
(45) Date of Patent: Jun. 27, 2006

(54) LOW-WASTE PEELER

(76) Inventor: Michael Haberstroh, Wilhelm Hauff Weg 5, D-78532 Tuttlingen (DE)

( * ) Notice: Subject to any disclaimer, the term of this patent is extended or adjusted under 35 U.S.C. 154(b) by 58 days.

(21) Appl. No.: 10/702,284

(22) Filed: Nov. 6, 2003

(65) Prior Publication Data
US 2004/0117991 A1 Jun. 24, 2004

(30) Foreign Application Priority Data
Nov. 6, 2002 (CH) .................... 1865/02

(51) Int. Cl.
*A01D 1/00* (2006.01)
(52) U.S. Cl. .................. 30/279.6; 30/143; 30/527; 30/532; 30/539; 30/540; 99/588
(58) Field of Classification Search ............ 30/539, 30/540, 279.6, 527, 532, 142, 143; 99/588, 99/586
See application file for complete search history.

(56) References Cited

U.S. PATENT DOCUMENTS

| | | | |
|---|---|---|---|
| 2,232,940 A | 2/1941 | Fender | |
| 2,986,813 A | 6/1961 | De Vault | |
| 3,172,202 A * | 3/1965 | Sooter | 30/539 |
| 4,777,722 A * | 10/1988 | Trotta | 30/84 |
| 4,879,811 A * | 11/1989 | Cooney | 30/527 |
| 5,167,069 A * | 12/1992 | Quinn | 30/527 |
| 5,687,485 A * | 11/1997 | Shurtleff et al. | 30/526 |
| 6,122,826 A * | 9/2000 | Coffin et al. | 30/57 |

FOREIGN PATENT DOCUMENTS

GB 2258393 A * 2/1993

* cited by examiner

*Primary Examiner*—Timothy V. Eley
*Assistant Examiner*—Isaac N. Hamilton
(74) *Attorney, Agent, or Firm*—Victor N. King; Speckman Law Group PLLC

(57) ABSTRACT

The present invention provides a cost-saving and space-saving combination of a low-waste peeler and an auxiliary tool. The low-waste peeler comprises an elongate grip and a fork-like mounting pivotally and movably connected to the grip. The mounting is provided with two prongs, and a swinging blade is attached between the prongs. The mounting is pivotally and movably connected to the auxiliary tool as one piece, while the grip is a separate part. The mounting and the auxiliary tool are pivotally and movably attached to the grip. In the peeling position, the auxiliary tool is accommodated in the grip of the peeler.

14 Claims, 6 Drawing Sheets

LOW-WASTE PEELER

CLAIM FOR FOREIGN PRIORITY UNDER 37 U.S.C. §119

This application claims foreign priority to Swiss Patent Application No. CH 1865/02, filed Nov. 6, 2002.

FIELD OF INVENTION

The present invention relates to a peeling device and particularly to a device for peeling various vegetables and fruits.

BACKGROUND OF THE INVENTION

One of the oldest types of low-waste peeler is shaped similar to a knife and has a holding shank on which a cutting blade is provided on the axial extension of an elongated grip. The cutting blade is provided with a slot. A cutting edge is provided on one side of the slot while the other side of the slot serves as a guide. Peeling thickness is accordingly limited by this type of peeler and one may avoid cutting off unnecessarily thick peels when using this type of peeler.

Besides the above-mentioned low-waste peeler, another type of low-waste peeler was developed about 50 years ago, which is particularly widespread today. This type of low-waste peeler consists of a grip and a swinging blade, which is held in a fork-like mounting in a pivotally movable manner. An example of this type of low-waste peeler is disclosed in U.S. Pat. No. 2,986,813, wherein the grip and the mounting are formed from a single metal strip. This extremely inexpensive version of a low-waste peeler is also very widespread today. In contrast to this version, another type of low-waste peeler exists in the market today wherein the grip and the fork-like mounting of the peeler are made of a single plastic part, and wherein the grip resembles the shape of a common screwdriver grip. The fork-like mounting, on which the swinging blade is mounted, is integrally formed with the grip and the swinging blade runs perpendicular to the running direction of the grip.

The above-described low-waste peelers are kitchen utensils that have limited utility. These low-waste peelers may not be practically used for any other purposes other than removing peels from certain vegetables. Most of these low-waste peelers are provided with inadequate auxiliary tools for removing eyes from potatoes. These auxiliary tools are generally lug-like cut-out tools attached to the peeler's fork-like mounting. Not only are these auxiliary tools designed extremely poorly, but they are also arranged incorrectly with respect to the movements to be performed. The low-waste peelers of interest here are designed in a way so that the peeling movement is a simple pulling movement. The cut-out lugs on these low-waste peelers of interest may be arranged laterally so that the lugs may be easily applied by way of rotational movement of a user's hand. In real life, these cut-out lugs are hardly used, and the potato eyes are usually removed either with a conventional knife or by peeling over the eye several times with the potato peeler. Although this can be done quickly, more substance of the potato is removed than necessary in this manner and the advantage of the low-waste peeler is therefore lost.

Further, previous low-waste peelers designs were mainly intended for the peeling of potatoes. However, it is now common to use low-waste peelers to peel various fruits and vegetables, such as cucumbers, carrots, melons, and various tropical and subtropical fruits. It is therefore desirable to provide a low-waste peeler with an auxiliary tool which may be used to efficiently prepare a variety of vegetables and fruits.

SUMMARY OF THE INVENTION

The present invention provides a low-waste peeler equipped with auxiliary tools for carrying out additional operations during the preparation of vegetables or fruits. The inventive low-waste peeler comprises an elongate grip and a fork-like mounting pivotally and movably connected to the grip. The elongate grip has a convex, anatomically shaped surface. The grip is provided with two side walls running approximately parallel to a longitudinal axis of the grip. The rear region of the grip has an approximately rounded end, while the front region of the grip merges into the side walls. The side walls are provided with two openings, also referred to as bearing claws, wherein more than half of the openings are closed around the perimeter. The mounting of the peeler is exchangeably fastened to these circular openings.

The front region of the grip is additionally provided with a through-opening that opens through the top of the grip. A small cornered opening is further provided close to the middle region on the surface of the grip. The cornered opening may receive a resilient retaining tongue that is integrally provided on the lower side cavity of the grip.

The mounting comprises two prongs connected to each other to form a semicircle. A swinging blade is held between the two ends of the at least two prongs. The prongs are provided with bearing channels running parallel to each other and arranged laterally to the auxiliary tool. The peeler may be further provided with potato eye gougers integrally formed on the prongs. These gougers are arc-like shaped on one side of the prongs and acutely shaped on the other side of the prongs.

The peeler of the present invention may be provided with a variety of auxiliary tools, such as a decorer, a fruit pulp portioner, or a cut-out knife. At the connection between the auxiliary tool and the connection location between the two prongs, a latching opening is provided, into which the resilient retaining tongue may be latched in the end position, so that the low-waste peeler may be used to perform peeling actions. Between the latching opening and the connection location, several, perpendicularly, or upwardly, standing blades arranged in a circle, are provided and arranged around a round opening. When the low-waste peeler is in its peeling position, and the blades are required, the auxiliary tool lies in the lower hollow region of the grip. In this arrangement, the blades engage the through-opening on the grip and thereby retain the mounting in the end position. The auxiliary tool may be attached to the grip via the through-opening and the blades engagement and also via the resilient retaining tongue and opening arrangement.

The locking means mentioned above for securing the pivoting of the auxiliary tool relative to the grip is effected by the shape of through-opening. The through-opening may be shaped as a cylindrical annular wall. The cut-out blades, arranged annularly, may additionally be provided with positive fit means, for example, an annular rim or bead. The annular rim engages into a corresponding annular groove in the cylindrical annular wall of the through-opening and thus acts as a locking mean.

The auxiliary tool, when provided as a cut-out knife, comprises a bore on its surface. The bore may be lockingly engaged by the resilient retaining tongue, forming a locking means. The cut-out blades may engage into the through-opening to form a locking means which secures the cut-out knife in the grip and prevents the knife from unintentional pivot movements when the low-waste peeler is in its peeling position.

A blade protection element is additionally provided to the peeler of the present invention. The blade protection has a semi-cylindrical, flattened, cover surface with two longitudinal edges. One of the two longitudinal edges is provided with incisions running perpendicularly to the longitudinal edge. On the cover side of the blade protection element, a grip surface is integrally provided in the region of each of the longitudinal edges. The grip surfaces lie opposite to one another and project upwards with respect the cover surface of the blade protection element in a tab-like manner.

The inner regions of the longitudinal edges are provided with a rib-shaped longitudinal rim or bead. Also, on the side of the blade protection where the incisions are present, spring tongues are formed between two incisions. The rib-shaped longitudinal rims are only provided on the two spring tongues next to the region where the grip surfaces are integrally provided. On the longitudinal edge with no incisions, only one rib-shaped longitudinal rim is integrally provided, and specifically only in the region below the grip surface. When the two grip surfaces are pressed together, the blade protection element is spread apart in this region and may thus be lifted. When the blade protection element is placed on the swinging blade, this region is not spread and only the spring tongues deflect outwards.

The swinging blade may also be provided with a protective sleeve. The protective sleeve is provided with a locking pin which may engage in an opening in an upper surface of the grip, thereby securing the auxiliary tool in its position of use.

BRIEF DESCRIPTION OF THE DRAWINGS

Preferred embodiments of the present invention are described in detail below and illustrated in the drawings, in which.

DETAILED DESCRIPTION OF THE INVENTION

Figure 1:
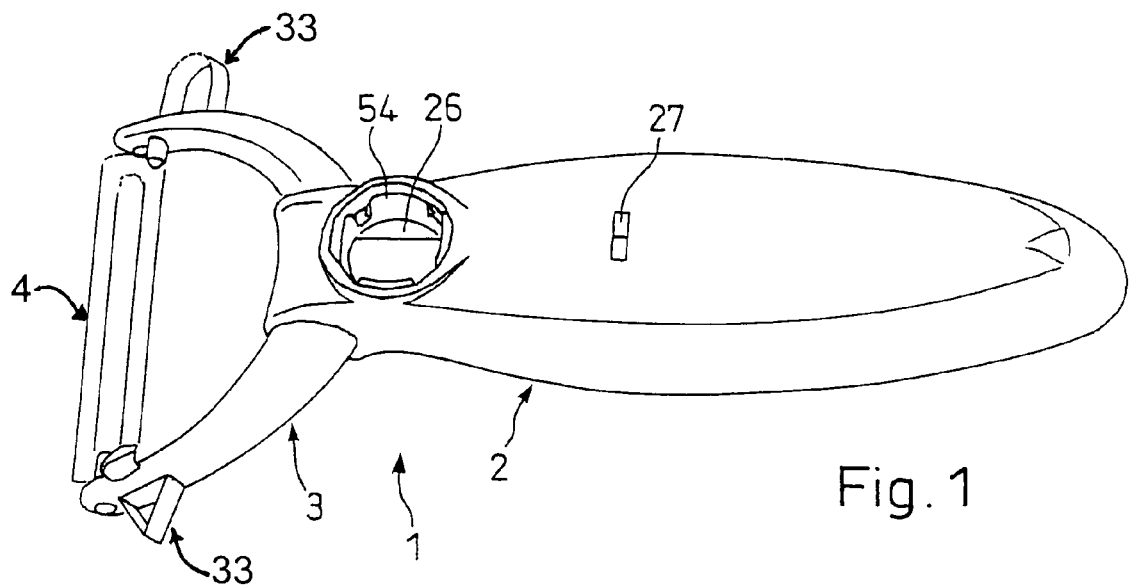
FIG. 1 shows a top perspective view of an embodiment of the low-waste peeler of the present invention.
Figure 3:
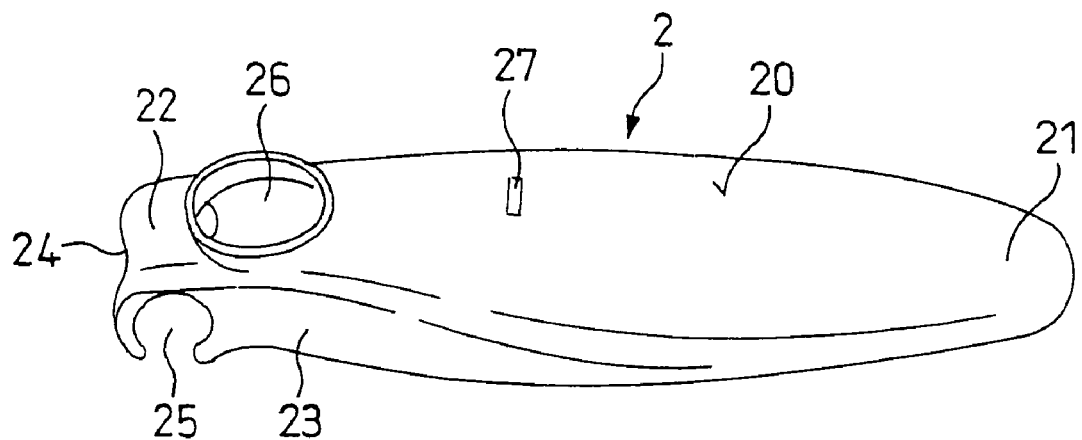
FIG. 3 shows a top perspective view of a grip of the low-waste peeler of FIG. 1.
Figure 4:
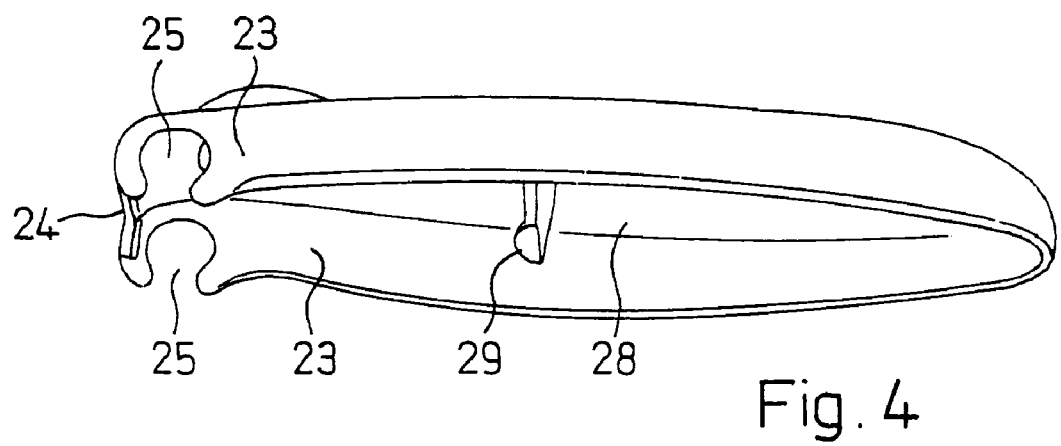
FIG. 4 shows a bottom perspective view of the grip of FIG. 3.

A low-waste peeler 1 of the present invention is shown in FIG. 1. The peeler comprises an elongate grip 2 and a fork-like mounting 3 pivotally and movably connected to the grip 2. The elongate grip 2, as shown in FIG. 3, has a convex, anatomically shaped surface 20. The surface 20 may be ergonometrically embossed. The grip 2 is provided with two side walls 23 running approximately parallel to a longitudinal axis of the grip 2. The side walls 23 are arranged on grip 2 so that they are parallel and opposite to one another. The rear region 21 of the grip 2 has an approximately rounded end, while the front region 22 of the grip 2 merges into the side walls 23. The front region 22 is provided with a front end-face 24, which forms a claw-like termination that points generally downwards. As shown in FIGS. 3 and 4, the side walls 23 are provided with two openings, also referred to as bearing claws 25, wherein more than half of the openings is closed around the perimeter. These two bearing claws 25 are arranged congruently flush behind one another. The mounting 3 of peeler 1, as shown in FIG. 1, is exchangeably fastened to these two bearing claws 25.

The front region 22 of grip 2 is additionally provided with a through-opening 26 that opens through the top of the grip 2. This through-opening 26 may securely accommodate an orange peel piercer integrally formed on the mounting 3, wherein an end positioning securement may be simultaneously combined. A small cornered opening 27 is further provided close to the middle region on the surface 20 of grip 2. As shown in FIG. 4, the opening 27 may receive a resilient retaining tongue 29 that is integrally provided on the lower side cavity 28 of the grip 2. The opening 27 may also allow a protection element to be pushed over a swinging blade 4 in a locking manner and thus secures the mounting 3 in a second end position.

Figure 5:
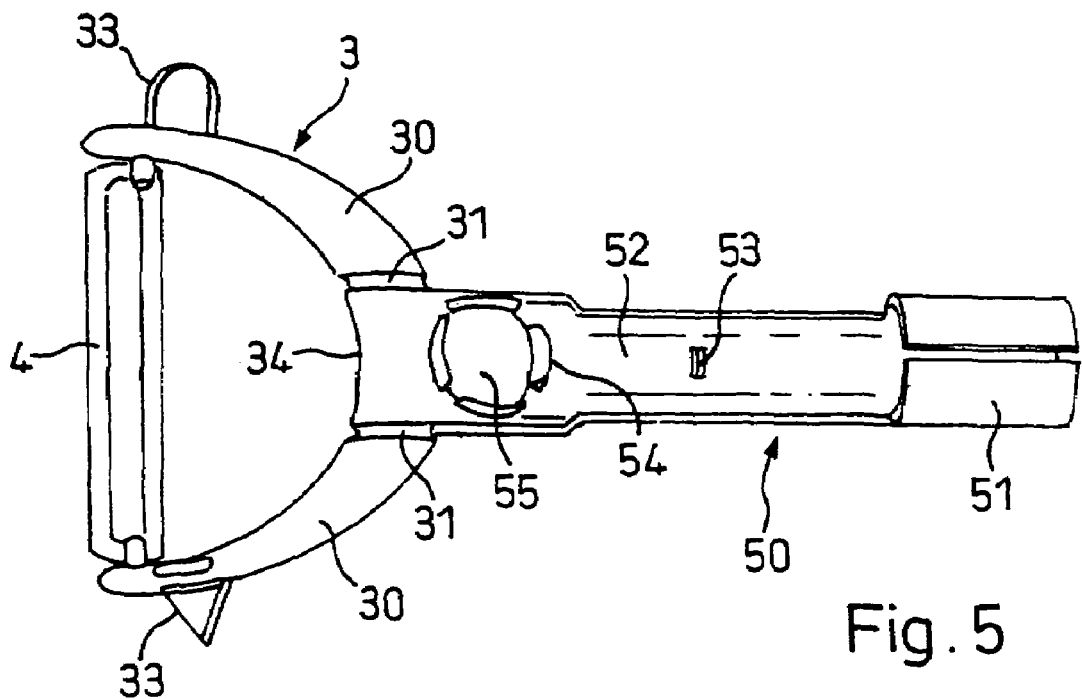
FIG. 5 shows a side view of an embodiment of a mounting of a low-waste peeler of the present invention, having an auxiliary tool designed as a hollow-cylindrical apple decorer.
Figure 6:
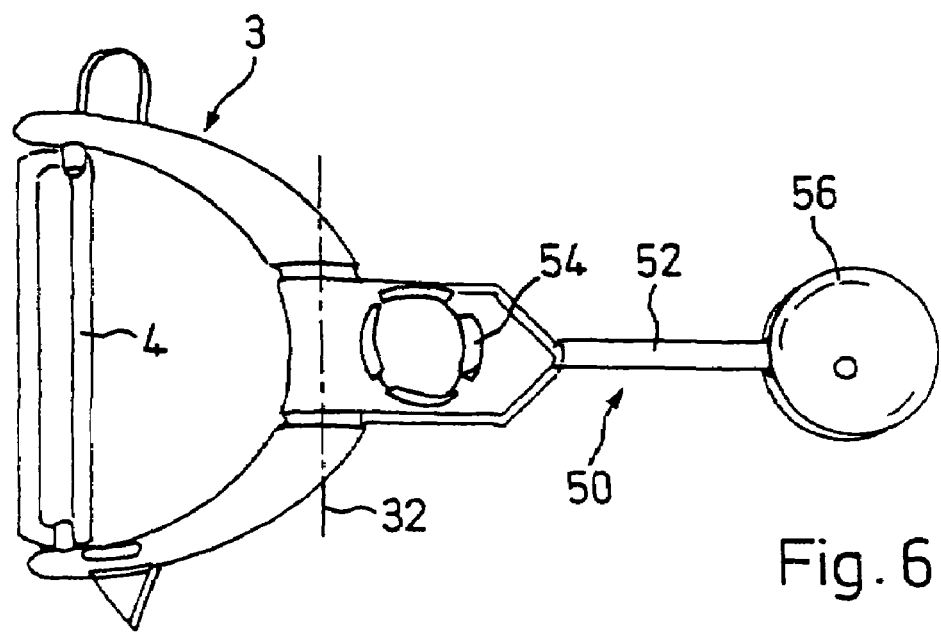
FIG. 6 shows a side view of another embodiment of a mounting of the present invention, having an auxiliary tool designed as a fruit pulp portioner or a melon scoop.

The fork-like mounting 3 of the peeler is shown FIGS. 5 and 6. The mounting 3 comprises two prongs 30 connected to each other to form a semicircle. A swinging blade 4 of conventional design, usually made of hardened steel, is held between the two ends of the two prongs 30. Various types of auxiliary tools may be integrally formed at the apex of the semicircle formed by the prongs 30. The auxiliary tool runs outwards with respect to the semicircle and perpendicular to the swinging blade 4. The prongs 30 are provided with bearing channels 31. The bearing channels 31 run parallel to each other and are arranged laterally to the auxiliary tool. The diameter of the bearing channels 31 corresponds to the diameter of the circular openings of the bearing claws 25 on grip 2. As shown in FIG. 6, the connection path between the two bearing channels 31 forms a pivot axis 32 about which the grip 2 and the mounting 3 may be pivoted relative to one another. The two circular bearing channels 31 run perpendicularly to the pivot axis 32.

As shown in FIGS. 5 and 6, the peeler may be further provided with potato eye gougers 33 integrally formed on the prongs 30. These gougers 33, which are preferably integrally formed using injection-molding technology, are arc-like shaped on one side and acutely shaped on the other side.

Figure 2:
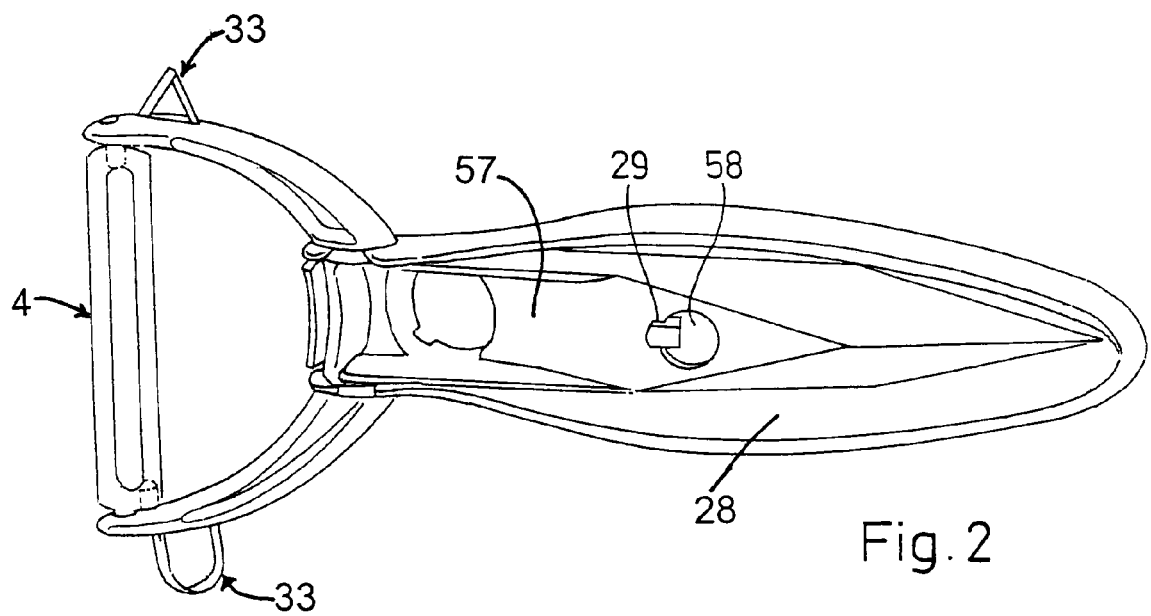
FIG. 2 shows a bottom perspective view of the low-waste peeler of FIG. 1.

The peeler of the present invention may be provided with a variety of auxiliary tools 50. Two embodiments of the auxiliary tools 50 are shown in FIGS. 5 and 6. In FIG. 5, the auxiliary tool is a decorer 51, with which a core may be cut out from a fruit. An apple may thus be completely peeled and its core may be removed by using the peeler with the decorer 51 as an auxiliary tool, without the need for another tool to accomplish the tasks. At the connection 52 between the decorer 51 and the connection location 34 between the two prongs 30, a latching opening 53 is provided, into which the resilient retaining tongue 29 may be latched in the end position, so that the low-waste peeler may be used to perform peeling actions. Between the latching opening 53 and the connection location 34, several perpendicularly, or upwardly, standing blades 54 are provided arranged around a round opening 55. The blades 54, arranged in a circle, may be used for cutting out, for example, the stem point of a fruit, such as citrus fruits. The blades 54 cut a circle into the fruit peel, which results in easier peeling. As shown in FIG. 2, when the low-waste peeler 1 is in its peeling position, and the blades 54 are not required, the auxiliary tool 50 lies in the lower hollow region of the grip 2. In this arrangement, the blades 54 engage the through-opening 26 on the grip 2 and thereby retain the mounting 3 in the end position. This arrangement may be used to attach an auxiliary tool to the grip 2 without the use of the resilient retaining tongue 29 latching arrangement.

A similar blades 54 and through-opening 26 arrangement is shown in FIG. 6. A fruit pulp portioner 56, in the shape of a spoon, is provided as the auxiliary tool in this embodiment. The fruit pulp portioner 56 may also be used to decor melons, cucumbers, courgettes, or other vegetables. Since it is difficult to provide a latch arrangement in this embodiment due to the width of the connection 52 to the fruit pulp portioner 56, the blades 54 and through-opening 26 arrangement is provided to connect the fruit pulp portioner 56 to the grip 2.

When the auxiliary tool 50 is attached to the grip 2 of the low-waste peeler 1, the peeler 1 of the present invention looks practically like other conventional low-waste peelers. In the attached position, the auxiliary tool 50 may not be seen when the low-waste peeler 1 is used as a peeler, since the auxiliary tool 50 is accommodated in the lower hollow region 28 of the grip 2, as shown in FIG. 2. Only the means for positioning auxiliary tool 50, namely, the through-opening 26, the blades 54, and the opening 27 can be seen in this position. Since the mounting 3 and the auxiliary tool 50 are connected as one piece and are arranged practically linearly flush behind one another, it is not easily recognizable that the fork-like mounting 3 is pivotally and movably connected to the auxiliary tool.

Figure 8:
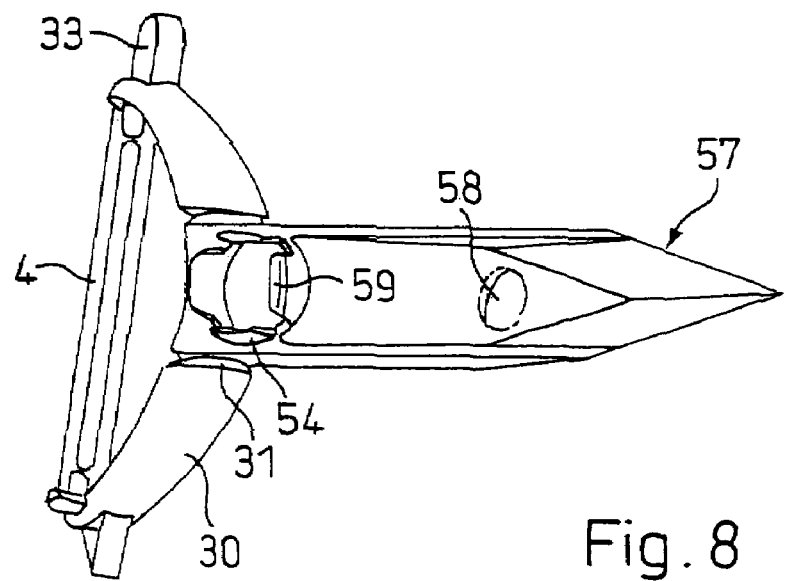
FIG. 8 shows a perspective view of the cut-out knife of FIG. 7.
Figure 9:
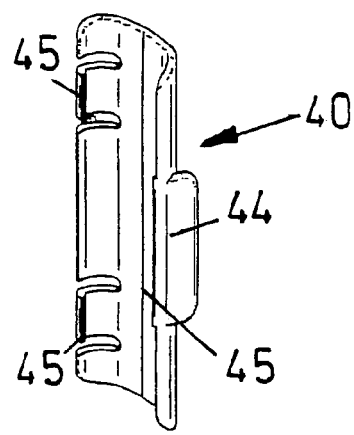
FIG. 9 shows a perspective view of a blade protection element of the present invention.
Figure 10:
FIG. 10 shows a lateral view of the blade protection element of FIG. 9.
Figure 11:
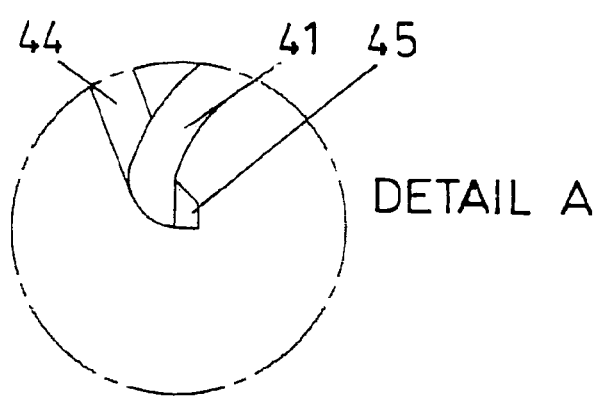
FIG. 11 shows an enlarged view of the blade protection element of FIG. 10.

The locking means mentioned above for securing the pivoting of the auxiliary tool 50 relative to the grip 2 is effected by the shape of through-opening 26. The through-opening 26 is shaped as a cylindrical annular wall. As shown in FIG. 8, the cut-out blades 54 which are also arranged annularly may additionally be provided with positive fit means, such as an annular rim or bead 59. The annular rim 59 engages a corresponding annular groove in the cylindrical annular wall of the through-opening 26 and thus acts as a locking means.

In the embodiment shown in FIGS. 1 and 2, the auxiliary tool 50 is provided as a cut-out knife 57, which may be used to cut into or cut out various fruit peels. As shown in FIG. 2, the cut-out knife 57 comprises a bore 58 on its surface. The bore may be lockingly engaged by resilient retaining tongue 29, forming a locking means. Likewise, the earlier mentioned blades 54 which are arranged in a circle, engage into the through-opening 26, also forming a locking means which secures the cut-out knife 57 in the grip 2 and prevents the knife 57 from unintentional pivot movements when the low-waste peeler 1 is in its peeling position.

Figure 7:
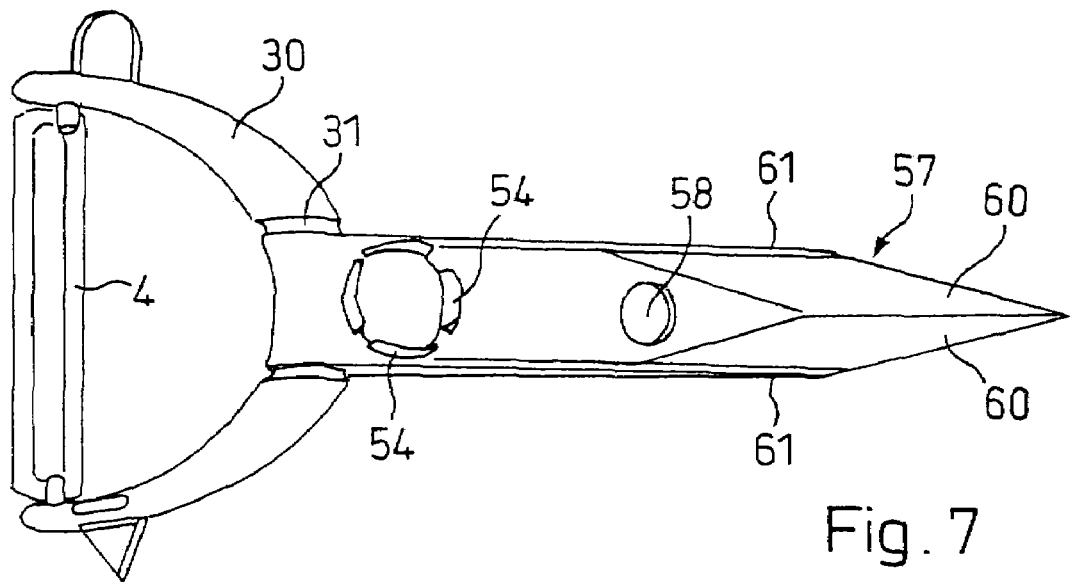
FIG. 7 shows a side view of still another embodiment of a mounting of the present invention, having an auxiliary tool designed as a cut-out knife.

The cut-out knife 57 is a particularly preferred embodiment since the cut-out knife 57 may be used for the many tasks, such as scoring peels, carrying out certain cutting activities, and cutting out the stem area of a citrus fruit by way of the blades 54. Furthermore, as shown in FIG. 7, the blade of the cut-out knife 57 may be three-dimensional and somewhat elongated and spoon-like shaped. The blade is provided with two acute-angled cutters 60 and two parallel side walls 61, which results in a spoon-like shape. This configuration permits the cut-out knife 57 to also be used for removing cores from cucumber-like vegetables.

The fork-like mounting 3 may be pivoted out of the peeling position, wherein the fork-like mounting 3 and the swinging blade 4 are positioned in the region above the grip 2, while the auxiliary tool 50 points forwards, practically as an extension of the grip 2. Depending on the type of movement required, one may hold the low-waste peeler 1 in the hand so that the hollow lower side 28 lies at the top and thus the low-waste blade 4 bears at the bottom on the grip 2. This arrangement is particularly useful when the fruit pulp portioner is used as the auxiliary tool 50.

Figure 12:
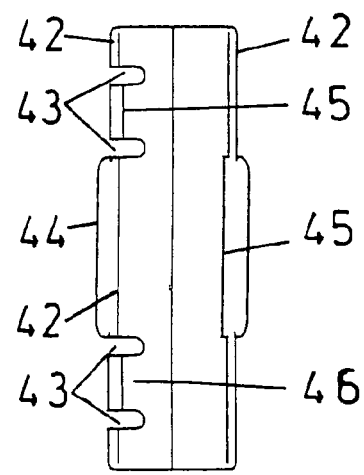
FIG. 12 shows a bottom view of the blade protection of element FIG. 9.
Figure 13:
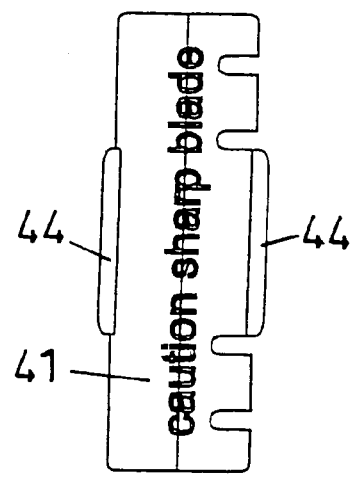
FIG. 13 shows a top view of the blade protection element of FIG. 9.

Since the auxiliary tool 50 is held reversibly in the hand when using the swinging blade 4 of the low-waste peeler, the covering of the swinging blades is important. A blade protection element 40, shown in FIGS. 9–15, is therefore additionally provided in the peeler of the present invention. As shown in FIGS. 12 and 15, the blade protection element 40 has a semi-cylindrical, flattened, cover surface 41 with two longitudinal edges 42. One of the two longitudinal edges 42 is provided with incisions 43 running perpendicularly to the longitudinal edge 42. As shown in FIG. 15, on the cover side of the blade protection element 40, a grip surface 44 is integrally provided in the region of each of the longitudinal edges 42. The grip surfaces 44 lie opposite to one another and project upwards with respect to the cover surface 41 of the blade protection element 40 in a tab-like manner, beyond the lateral longitudinal edges 42. The grip surfaces 44 are used for placing on or removing the blade protection 40 element from the swinging blade 4.

Figure 14:
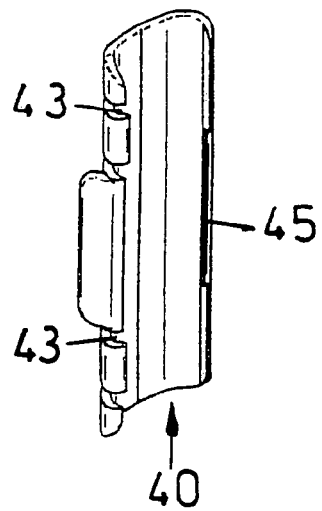
FIG. 14 shows a perspective and opposite view of the blade protection element of FIG. 9.
Figure 15:
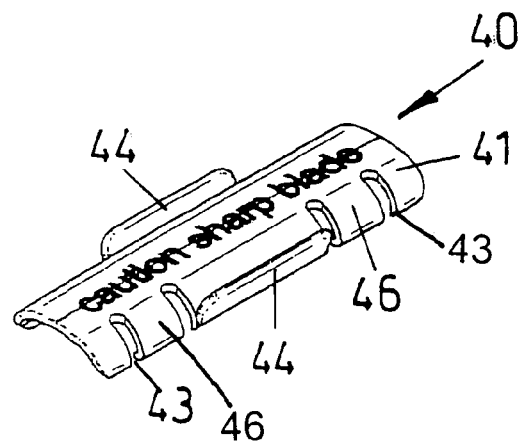
FIG. 15 shows a schematic view of the blade protection element of FIG. 9.

As shown in FIGS. 12 and 14, the inner regions of the longitudinal edges 42 are provided with a rib-shaped longitudinal rim or bead 45. The rim is used for the actual mounting of the blade protection element 40 onto the swinging blades 4. As shown in FIG. 15, on the side of the blade protection element 40 where the incisions 43 are present, spring tongues 46 are formed between two incisions 43. The rib-shaped longitudinal rims 45 are only provided on the two spring tongues 46 next to the region where the grip surfaces 44 are integrally provided. On the longitudinal edge 42 with no incisions 43, only one rib-shaped longitudinal rim 45 is integrally provided, and specifically only in the region below the grip surface 44. When the two grip surfaces 44 are pressed together, the blade protection element 40 is spread apart in this region and may thus be lifted. When the blade protection element 40 is placed on the swinging blade, this region is not spread and only the spring tongues 46 deflect outwards.

The swinging blade 4 may also be provided with a protective sleeve. The protective sleeve attaches to the swinging blade 4. The protective sleeve is provided with a locking pin which may engage in a recess or opening 27 in an upper surface of the grip 2, thereby securing the auxiliary tool 50 in its position of use.

Since the grip 2 of the fork-like mounting 3 and the auxiliary tool 50 may be separated from one another, the complete cleaning of the low-waste peeler 1 may be performed with ease. The low-waste peeler may therefore be separated into two parts to be cleaned in a dishwasher. The separation of the two parts also results in the possibility of manufacturing the low-waste peeler without the need for a complex injection molding tool with slides.

I claim:

1. A low-waste peeler comprising:
   (a) an elongate grip;
   (b) a fork-like mounting having two prongs;
   (c) a swinging blade pivotally and movably connected between the two prongs and positioned perpendicularly to the longitudinal axis of the grip; and
   (d) an auxiliary tool positioned in a lower hollow region of the grip and connected to the mounting as one piece, wherein the mounting is pivotally and movably connected to the grip such that the auxiliary tool may be accommodated in the grip when the peeler is in a peeling position and has an approximately semi-arc shape formed by the two prongs, the auxiliary tool is integrally formed on an apex of the mounting and bearing channels are formed on both sides of a projection of the auxiliary tool, and wherein the grip is provided with two bearing claws which engage the bearing channels with a positive fit to form a pivotally movable connection of the grip to the mounting.

2. The low-waste peeler according to claim 1, wherein, when the peeler is in a peeling position, the auxiliary tool is securely connected to the grip by at least one locking means and is thereby prevented from unintended pivoting movements.

3. The low-waste peeler according to claim 1, wherein the grip further comprises an ergonometrically embossed upper surface and is formed on a lower side as a cavity.

4. The low-waste peeler of claim 3, wherein a retaining tongue provided with a retaining lug at one end is positioned in the cavity and wherein the auxiliary tool comprises means for engaging the retaining tongue when the peeler is in a peeling position, whereby the retaining lug secures the auxiliary tool to the grip.

5. The low-waste peeler of claim 4, wherein the means for engaging the retaining tongue is a recess.

6. The low-waste peeler of claim 4, wherein the means for engaging the retaining tongue is a bore.

7. A low-waste peeler according to claim 1, wherein the auxiliary tool is designed as a cut-out knife.

8. The low-waste peeler according to claim 1, wherein the swinging blade is provided with a protective sleeve which may be attached thereon.

9. A low-waste peeler according to claim 8, wherein the protective sleeve is provided with a locking pin which may engage in a recess or an opening in an upper surface of the grip, and thereby securing the auxiliary tool in its position of use.

10. The low-waste peeler according to claim 1, wherein the auxiliary tool further comprises circularly arranged cut-out blades positioned near to the bearing channels.

11. The low-waste peeler according to claim 10, wherein the grip further comprises a circular through-opening positioned near the pivot bearing, with a cylindrical annular wall directed to an open lower side, in which the cut-out blades may be securely held.

12. The low-waste peeler according to claim 11, wherein the cut-out blades comprise positive fit means which cooperate with positive fit means in the cylindrical annular wall of the through-opening and secures the auxiliary tool to the grip.

13. The low-waste peeler according to claim 1, further comprising a blade protection element to be mounted on the swinging blade, the blade protection element comprising a cover surface with resilient regions and grip surfaces, and rib-like longitudinal runs for clip-like mounting on the swinging blade.

14. The low-waste peeler according to claim 13, wherein the cover surface comprises a first and a second longitudinal edge, the first longitudinal edge being provided with incisions running transversely to the longitudinal direction and spring tongues formed between the incisions, and wherein the rib-like longitudinal rims are integrally formed on the spring tongues and, on the second longitudinal edge, only in the region below the grip surface.

* * * * *